United States Patent [19]

Ramaswamy et al.

[11] Patent Number: 6,021,396

[45] Date of Patent: *Feb. 1, 2000

[54] METHOD TO PROVIDE SENSITIVITY INFORMATION FOR (R,S,S) INVENTORY SYSTEMS WITH BACK-ORDERED DEMAND

[75] Inventors: Sanjay Elathur Ramaswamy, Scarsdale; Ying Tat Leung, Tarrytown, both of N.Y.

[73] Assignee: International Business Machines Corporation, Armonk, N.Y.

[ * ] Notice: This patent is subject to a terminal disclaimer.

[21] Appl. No.: 08/974,286

[22] Filed: Nov. 19, 1997

[51] Int. Cl.$^7$ ..................................................... G06F 17/60
[52] U.S. Cl. .................................. 705/28; 705/7
[58] Field of Search .................... 705/28, 29, 7, 705/8, 10; 364/918.4, 468.06, 468.07, 468.13, 468.14

[56] References Cited

U.S. PATENT DOCUMENTS 5,446,671   8/1995   Weaver et al. .......................... 364/468
5,699,259   12/1997   Colman et al. ..................... 364/468.05

OTHER PUBLICATIONS

Edward A. Silver and Rein Peterson, Decision Systems for Inventory Management and Production Planning, John Wiley & Sons, pp. 256–260, Mar. 21, 1985.

M. C. Fu and J–Q Hu, "(s,S) inventory systems with random lead times," Probability in the Engineering and Informational Sciences, vol. 8, pp. 355–376, Jan. 1994.

P. Glasserman and S. Tayur, "Sensitivity analysis for base-stock levels in multiechelon production–inventory systems," Management Science, vol. 41, No. 2., pp. 263–281, Feb. 1995.

Michael C. Fu, "Sample Path Derivatives For (s,S) Inventory Systems," Operations Research, vol. 42, No. 2, pp. 351–364, Apr. 1994.

"Sample path derivatives for (S,S) inventory systems" M.C. Fu, Operations Research, vol. 42, No. 2, 1994, pp. 351–363.

"(S,S) Inventory systems with random lead times" M.C. Fu and J–Q Hu, Probability in the engineering & informational science, vol. 8, 1994, pp. 355–376.

"Sensitivity analysis for base–stock levels in multiechelon production–inventory systems" P. Glasserman and S. Tayur, Management Science, vol. 41, No. 2, 1995, pp. 263–281.

*Primary Examiner*—Allen R. MacDonald
*Assistant Examiner*—Susanna Meinecke-Diaz
*Attorney, Agent, or Firm*—Whitman, Curtis & Whitham; Stephen C. Kaufman

[57] ABSTRACT

Sensitivity information about the average back-ordered sales and inventory levels of a back-order (R,s,S) inventory system is generated with respect to the two decision variables s and S. This information is used for what-if analysis and optimization of the decision variables s and S. The computer implemented algorithm provides sensitivity of both average inventory levels and average back orders with respect to changes in s and q (where q=S–s), for a back-order inventory simulation for any specified demand distribution. Further, the sensitivity information provided by the algorithm is exact when compared to a finite-difference simulation for the case of both discrete and continuous, stationary and non-stationary demands. A finite difference estimate of the sensitivity is obtained by running two simulations where the parameter in question (s or S) differ by a chosen small number, and then calculating the resulting difference in the performance measure of interest, in this case average inventory and back orders.

8 Claims, 5 Drawing Sheets

FIG.4B ns of items in inventory, the use of simulation to do sensitivity analysis to changes in s and S values becomes an extremely time consuming task. This has made undesirable and in some cases precluded the use of simulation to do performance analysis and optimization.

METHOD TO PROVIDE SENSITIVITY INFORMATION FOR (R,S,S) INVENTORY SYSTEMS WITH BACK-ORDERED DEMAND

CROSS-REFERENCE TO RELATED APPLICATION

This application is related in subject matter to application Ser. No. 08/922,286 filed Sep. 3, 1997, by Sanjay Elathur Ramaswamy et al. for "Method for Providing Sensitivity for a Class of (s,S) Inventory Systems" (IBM Docket YO997-075) and assigned to a common assignee herewith. The disclosure of application Ser. No. 08/922,286 is incorporated herein by reference.

BACKGROUND OF THE INVENTION

1. Field of the Invention

The present invention generally relates to computer software for business management and, more particularly, to a computer implemented method for providing sensitivity information about average back-ordered sales and inventory levels of a back-order (R,s,S) inventory system with respect to the two decision variables s and S for what-if analysis and optimization of the decision variables.

2. Background Description

The system under consideration manages the inventory level of an item where, once every period or at regular intervals, the inventory level is reviewed and if necessary purchase orders are placed to replenish depleted inventory, in accordance with a pre-specified decision rule. An (R,s,S) inventory policy is one such decision rule that specifies that inventory be relieved every R periods of time, and that an order be placed when the level of inventory on hand plus on order falls below the level s (a specified number), and the amount of order be the difference between S (another specified number) and the present level of inventory on hand plus on order; i.e., every time the inventory position (which refers to the sum of inventory on hand plus on order minus back order) falls below s, an order is placed to bring it up to S.

(R,s,S) policies are of great practical and theoretical interest, and much effort has gone into the determination of the appropriate values of s and S to optimize system performance measures and to obtain sensitivity information in this regard. The determination of these values becomes exceedingly complicated in the general case due to a number of factors. Specifically, the inventory system may be of the back order or lost sale type (depending on whether requests are backlogged or refused when there is no inventory on hand), and the demand distribution to which the system is subjected may vary over time.

The term "demand distribution", as used in this description, means the statistics of the consumer demand per unit time period, in terms of known approximation forms for and/or hypothetical models based on probability density and distribution functions characterizing observed sales events or hypothetical sales statistics, respectively. The only requirement for the selected demand distributions are that they be unambiguous and provide sufficient information to generate values of simulated demand over the time horizon under consideration.

In such cases, simulation is a useful tool to obtain information about the expected performance. Due to the requirement that several replications of the simulation have to be done to obtain meaningful estimates of performance, and the fact that a typical manufacturer/retailer has thousands of items in inventory, the use of simulation to do sensitivity analysis to changes in s and S values becomes an extremely time consuming task. This has made undesirable and in some cases precluded the use of simulation to do performance analysis and optimization.

To address this problem, investigations into obtaining the sample path derivative of performance measures with respect to s and S have been conducted for the back order case with stationary demands in M. C. Fu, "Sample path derivatives for (s,S) inventory systems", *Operations Research*, Vol. 42, No. 2, pp. 351–364, 1994. Extensions to address stochastic lead times are presented in M. C. Fu and J- Q Hu, "(s,S) inventory systems with random lead times", Probability in the Engineering and Informational Sciences", Vol.8, pp. 355–376, 1994. The use of Perturbation Analysis to obtain sensitivity information on inventory levels for base stock multi-echelon systems in discussed in P. Glasserman and S. Tayur, "Sensitivity analysis for base-stock levels in multiechelon production-inventory systems", Management Science, Vol.41, No.2., pp. 263–281, 1995. However, the technique used here differs from the literature in that it does not require the assumption of a stationary demand distribution.

SUMMARY OF THE INVENTION

It is therefore an object of the present invention to provide sensitivity information about the average back-ordered sales and inventory levels of a back-order (R,s,S) inventory system with respect to the two decision variables s and S.

It is another object of the invention to use this information for what-if analysis and optimization of the decision variables s and S.

According to the invention, there is provided a computer implemented algorithm that provides sensitivity of both average inventory levels and average back orders with respect to changes in s and q (where q=S−s), for a back-order inventory simulation for any specified demand distribution. Further, the sensitivity information provided by the algorithm is exact when compared to a finite-difference simulation for the case of both discrete and continuous, stationary and non-stationary demands. A finite difference estimate of the sensitivity is obtained by running two simulations where the parameter in question (s or S) differ by a chosen small number (i.e., s+Δ or S+Δ), and then calculating the resulting difference in the performance measure of interest, in this case average inventory and back orders.

The algorithm implemented is at least two and up to three times faster than the equivalent method of obtaining the very same information using a set of finite difference simulations. It differs from the comparable algorithm of M. C. Fu, supra, in that the results obtained are exact with those of a finite difference simulation, in that the technique is applicable for discrete or continuous, stationary or non-stationary (in time) demand distributions, the technique employed to calculate the sensitivity is different and also that the sensitivity can be calculated with respect to any user input change in the values of (R,s,S). The technique provided by M. C. Fu is applicable only to stationary demand distributions and estimates derivatives of performance with respect to s and S values. By virtue of the fact that the algorithm provides this sensitivity information for a type of inventory system that is both commonly found in real-life retail/distribution situations, as well as difficult to analyze mathematically, it can become a useful part of inventory control software to enable optimization and what-if analysis by the user.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

This invention will be described by first defining terms to be used, and describing the general method referring to FIG. 1, and then presenting a detailed embodiment by reference to the other drawings.

Problem Statement:

Let

T=time horizon under consideration.

i=1,2, . . . , T be the index of time.

$Y_i$=inventory position in period i, where inventory position refers to stock on hand plus on order minus back order.

$W_i$=inventory level in period i, refers to physical stock on hand.

$O_i$=incoming orders in period i.

$B_i$=Back Orders in period i.

$D_i$=randomly realized demand in period i.

L=order lead time, the time between placement of an order and its arrival.

s=Specified reorder point.

S=Specified order up to level.

R=inventory is reviewed every R periods of time.

Figure 1:
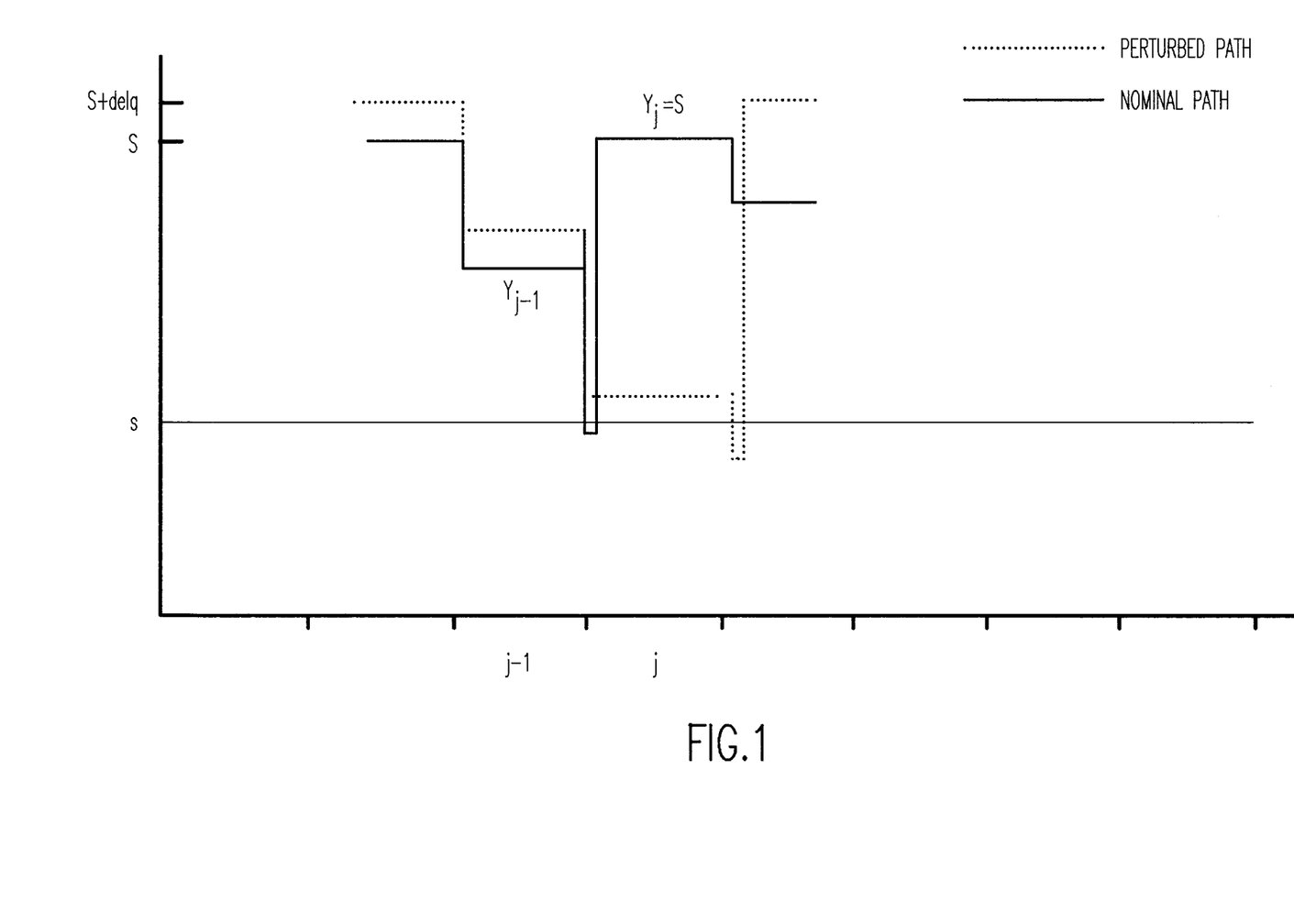
FIG. 1 is a graph reproduced from M. C. Fu, supra, showing the effect on sample path of inventory positions with s fixed and q perturbed in an inventory system with back orders.

Consider an inventory system where at discrete and periodic time intervals, first incoming orders are received and back-orders satisfied, the inventory position is reviewed, and then an ordering decision is made according to the (R,s,S) policy; i.e., if at the start of the time period, the inventory position is below s, then an order is placed to bring it up to S, as generally shown in FIG. 1 by the solid line.

The demand for the period is then realized and subtracted at the end of the period. If $Y_i$ and $W_i$ are defined after order placement and before demand subtraction, then $Y_{i+1}=Y_i-D_i$ if $Y_i-D_i \geq s$ $=S$ if $Y_i-D_i<s$ where $W_{i+1}=W_i-D_i+O_{i+1}$. $Y_n$ and $W_n$ can be either positive or negative.

Defining $[W_i]^+=\{0$ if $W_i<0, W_i$ if $W_i \geq 0\}$, and $[W_i]^-=\{0$ if $W_i \geq 0, -W_i$ if $W_i<0\}$, the performance measures of interest to us are Average Inventory Level $$\overline{W_T} = \frac{1}{T}\sum_{i=1}^{T}[W_i]^+,$$

Average Back order Level $$\overline{B_T} = \frac{1}{T}\sum_{i=1}^{T}[W_i]^-,$$

and we are interested in computing the sensitivity of these measures with respect to s and q where S=s+q; i.e., we would like to calculate $$\frac{\Delta E(\overline{W_T})}{\Delta s}, \frac{\Delta E(\overline{B_T})}{\Delta s}, \frac{\Delta E(\overline{W_T})}{\Delta q},$$

and $$\frac{\Delta E(\overline{B_T})}{\Delta q}.$$

Due to the fact that in practice inventory systems deal with discrete units of items, demand is realized as a random integer, and the setting of s,S levels is also in integer values. If we assume that all calculated values of s and S are truncated to integers, then the smallest value of Δ that is of interest is one unit. Changes in s or q less than one unit will result in the same inventory system as before and there will be no change in the performance measures. Clearly, then, for the purpose of sensitivity analysis or optimization of the decision variables, we need to only concern ourselves with integer value changes in s and q.

Algorithm

The algorithm implemented by the invention calculates the effect on performance due to unit changes in s and q. During each replication of the finite horizon simulation, the effect of the perturbation or change in performance due to a unit change in s and q is calculated, and the effect averaged over a repeated number of replications.

If $s_1$ is the initial value of s, and $s_2=s_1+\Delta s$, then the estimate made after N replications is $$\frac{E(\overline{W_T}(s_1, q) - \overline{W_T}(s_2, q))}{\Delta s} = \frac{E(\Delta \overline{W_T})}{\Delta s} = \frac{\Delta E(\overline{W_T})}{\Delta s} \quad (1)$$

where the operator E is the average over the number, N, of replications of the simulation. Equation (1) shows that the estimates made by the algorithm are unbiased.

For the purpose of this analysis, the nominal system is defined to be the base inventory system with the given values of s and S. The perturbed system is the inventory system where either the s or q values have been changed or perturbed. Also, Perturbation Analysis is abbreviated as PA.

Considering first the sensitivity of inventory levels with respect to "s", we use a modified IPA (Infinitesimal Perturbation Analysis) based calculation for the back order ease where the modification accounts for having the Δ value as a user input.

For the case of sensitivity with respect to q, event changes are now triggered by having the inventory position fall below s, but be above s−Δ, such that the nominal system places an order but the perturbed system does not, as shown by the dotted line in FIG. 1. As opposed to using the smoothed perturbation analysis (SPA) technique described in M. C. Fu, supra, our algorithm uses a partial trace of the difference between the two paths during such time when the event sequences of the nominal and perturbed path are different. We refer to this calculation as the Finite Perturbation Analysis (FPA). As opposed to the SPA method, our method provides exact values when compared to a finite difference simulation and allows for a user input Δ to be used. Additionally, our method is efficient because the probability of event changes are low, and even when such a divergence occurs the nominal and perturbed path will converge to the same event sequence whenever both systems place an order at the same time.

Implementation of Algorithm

Figure 2:
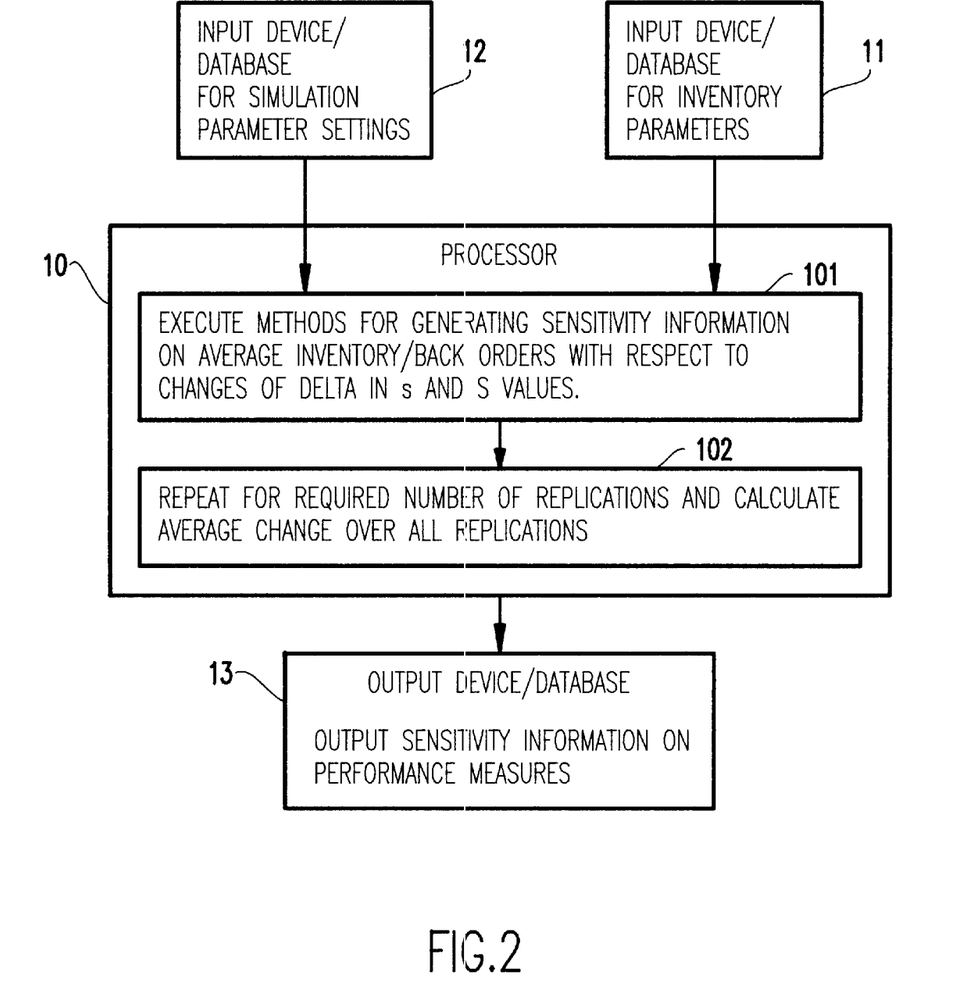
FIG. 2 is a block diagram illustrating a example of a hardware platform on which the invention may be implemented.

FIG. 2 shows in block diagram form the hardware on which the invention may be implemented. This hardware may be part of a networked system of personal computers (PCS), such as International Business Machines (IBM) Corporation's PS/2 series of personal computers running the OS/2 operating system on IBM's Token Ring network, or workstations, such as IBM's RS/6000 workstations running AIX (IBM's version of the UNIX operating system). Alternatively, the invention may be implemented on minicomputers, such as IBM's AS400 computers, or main frame computers, such as IBM's ES9000 computers.

In any of these alternative hardware platforms, the processor 10 receives as inputs inventory parameters from a first input device/database 11 and simulation parameters from a second input device/database 12. The devices 11 and 12 are typically a direct access storage device (DASD), such as a hard disk in the computer, storing the respective databases. The processor 10 is programmed to first of all execute methods for generating sensitivity information on average inventory/back orders with respect to changes of delta in s and S values. These methods are generally referenced at 101 in FIG. 1. The processor 10 is programmed to repeat the methods 101 for a required number of replications and then to calculate the average change over all replications in 102. The conclusion of the process is the output of sensitivity information on performance measures. This output may be to an output device/database 13. Device 13 may include a DASD for storing the output in a database and also an output device or devices, including a display and/or a print out.

Figure 3:
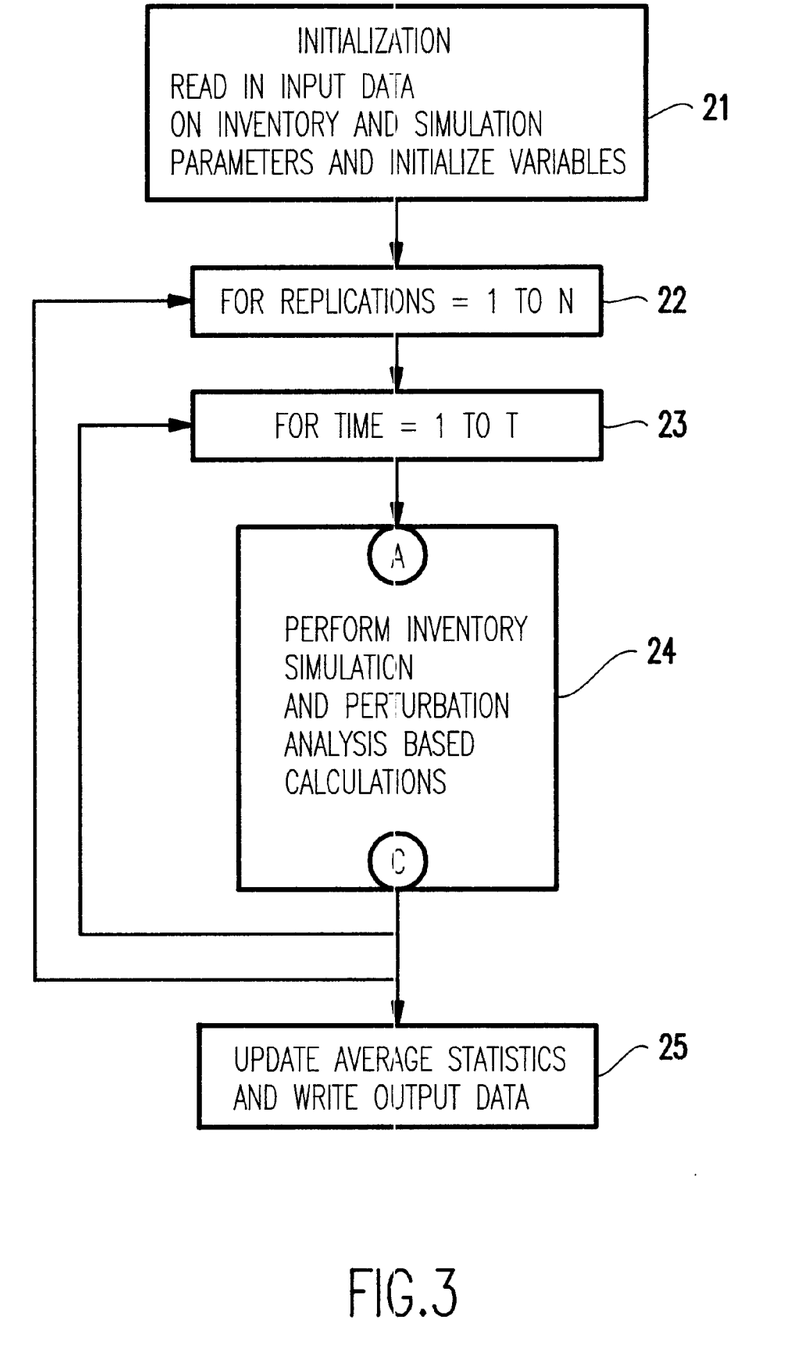
FIG. 3 is a flow diagram showing the logic of the overall process of the computer implemented method according to the invention.

The flow diagram of the program implemented on the hardware of FIG. 2 is shown in FIG. 3. The process starts with an initialization routine in function block 21. In this routine, the input data on inventory and simulation parameters is read from the databases 11 and 12, and variables are initialized. The process then enters two nested loops, the first of which is controlled by decision block 22 which causes the processing to be performed for N replications. The second loop is controlled by decision block 23 which causes the processing to be performed for a time period T. Within these loops, the main processing is performed in function block 24. The processing performed in function block 24 is to perform the inventory simulation and perturbation analysis according to the present invention. Once the processing of the nested loops is completed, the average statistics are updated in function block 25, and the output data is written to storage and display.

Figure 4A:
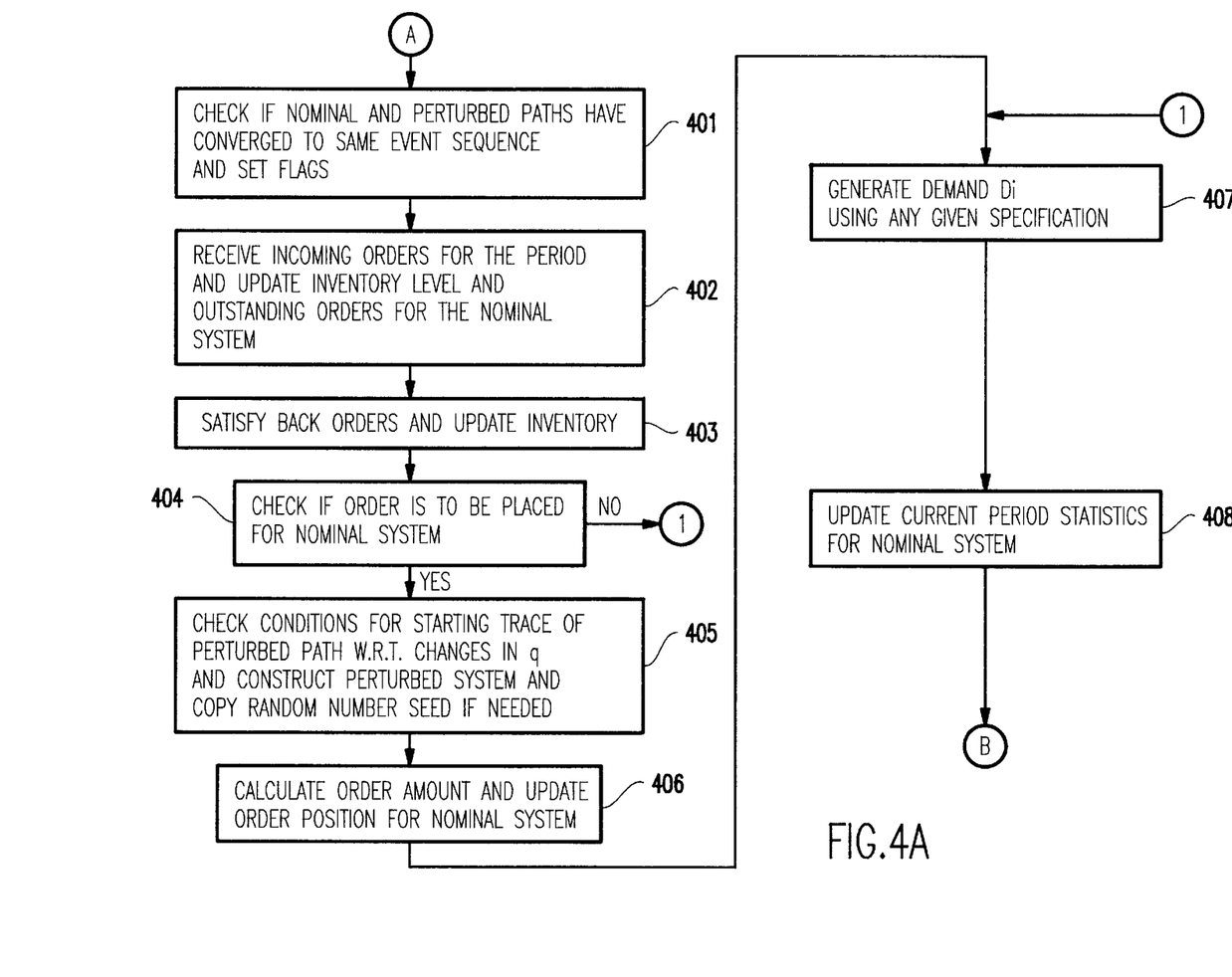
FIGS. 4A and 4B, taken together, are a flow diagram of the computations at each time period called by the inventory simulation and perturbation analysis function in the flow diagram of FIG. 3.
Figure 4B:
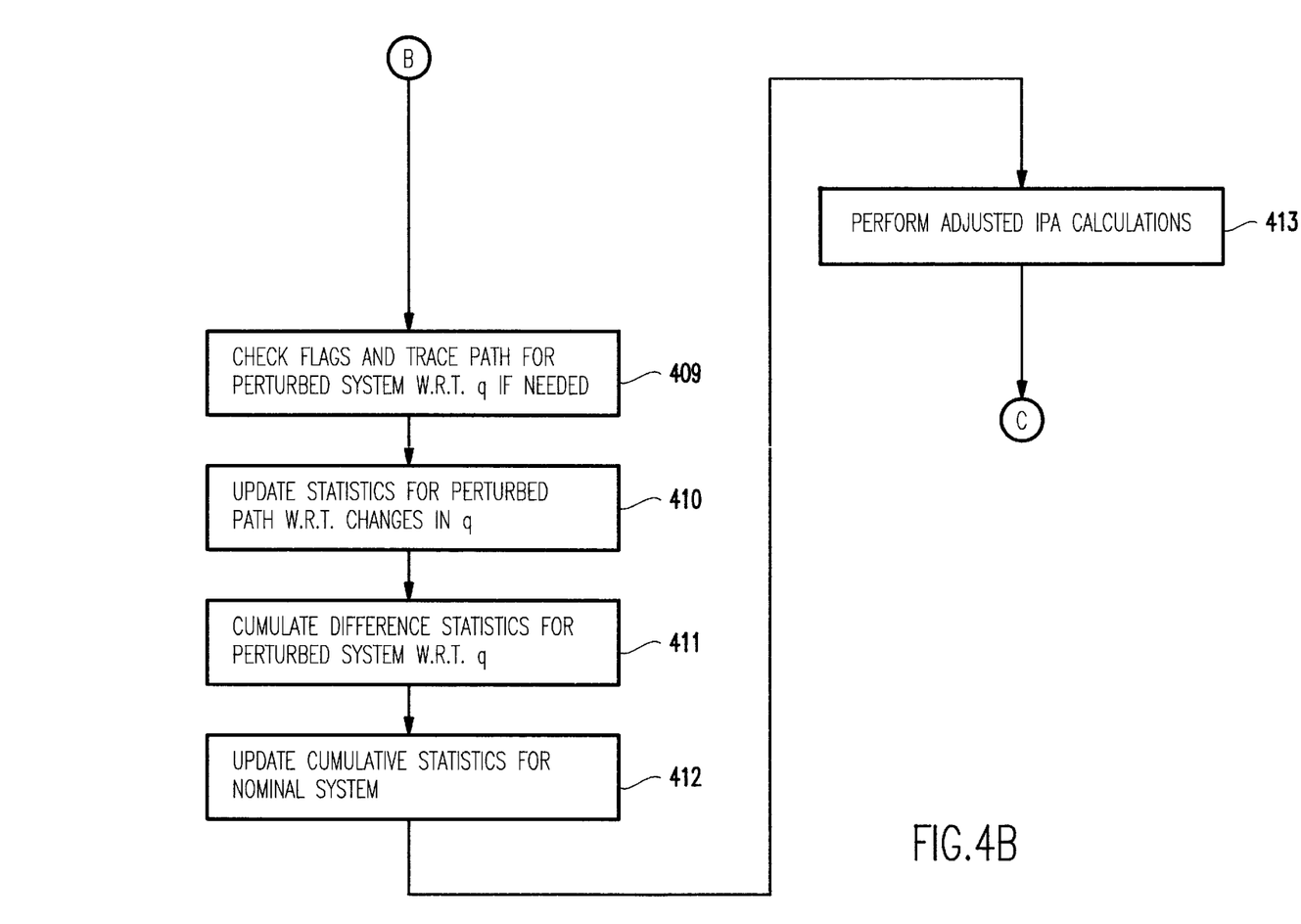

The processing of function block 24 is shown in more detail in FIGS. 4A and 4B, to which reference is now made.

The first step in this calculation is to check in function block 401 to determine if nominal and perturbed paths have converged to the same event sequence and to set flags representing a sequence of events associated with the physical inventory of the nominal system and a perturbed system. The first perturbed system is the system based on the q value perturbed by the Δ value. Incoming orders for the period are received in function block 402, and the inventory level and outstanding orders are updated for the nominal system. Back orders are satisfied and the inventory is updated in function block 403. A test is made in decision block 404 to determine if an order is to be placed for nominal system. If so, conditions are checked in function block 405 for starting trace of the perturbed path with respect to changes in q, and the perturbed system is constructed. A random number seed is copied, if needed. Then, in function block 406, the order amount is calculated, and the order position for the nominal system is updated.

The demand $D_i$ is generated in function block 407 using any given specification. This point in the process is reached either from function block 406 or decision block 404. Next, the current period statistics for the nominal system are updated in function block 408. Then, flags are checked in function block 409 (FIG. 4B), and the path for the perturbed system with respect to q is traced, if needed. The statistics for the perturbed path with respect to changes in q are updated in function block 410, and the cumulative statistics for the perturbed system are updated in function block 411. Cumulative statistics for the nominal system are updated in function block 412. Finally, the adjusted IPA calculations are performed in function block 413 before a return is made to the main program shown in FIG. 3.

The pseudocode which implements the process shown in FIG. 3 and FIGS. 4A and 4B is given below:

Initialize:
$Y_1 = W_1 = S$;
$B_i = 0$
$O_i = 0$, i=1, ..., T
TOTORD=0;
PASWITCH=ON;
JEPA=OFF;
DELTA=User input value, default to 1; /* Computing sensitivity with respect to unit change in s*/
RAND=current seed of random number stream used for nominal system demand generation
PRAND=current seed of random number stream used for perturbed system demand generation
Additionally, all other variables are initialized to zero.

Steps in Execution:

```
For Replication=1 to N
{
For Time index i=1 to T
{
/*Check if Nominal and Perturbed Systems with
respect to changes in q have converged to same
event sequence and set flags*/
If(PASWITCH==OFF) AND (RAND==PRAND)
AND (PW_i-W_i)==DELTA) AND ((PY_i-Y_i)==DELTA)
AND (HZERO==OFF)
then PASWITCH=ON;
/*Receive Incoming Orders for the Period and
update inventory level and outstanding orders
for the Nominal System*/
W_i=W_i+O_i
TOTORD=TOTORD-O_i
/*Satisfy back-orders and update inventory status*/
OldW_i=W_i;
```

```
W_i=max(0,W_i-B_i);
B_i=max(0,B_i-OldW_i);
Y_i=W_i+TOTORD-B_i;
/*Check if order is to be Placed for Nominal
System*/
If Y_i<s, then
{
/*Check conditions for starting trace of
perturbed path with respect to changes in q*/
If ((s-Yi)<=DELTA)
AND If(PASWITCH==ON)
{
/*Construct Perturbed system w. r. t. change in q
from current system state*/
If (W_i>0)
PW_i=W_i+DELTA;
Else
PW_i=0;
If (B_i>0)
PB_i=B_i-DELTA;
Else
PB_i=0;
PTOTORD=TOTORD;
PY_i=PW_i+PTOTORD-PB_i;
PO_j=O_j,j=i, ... , T;
PASWITCH=OFF;
JEPA=ON;
/*Copy random number seed for simulation of
perturbed system with respect to changes in q*/
PRAND=RAND;
}
/*Calculate Order amount and update order
position variables for Nominal System*/
ORDAMT=S-Y_i;
O_{i+L}=O_{i+L}+ORDAMT;
TOTORD=TOTORD+ORDAMT
Y_i=Y_i+ORDAMT;
}
Generate Demand D_i using any given demand
distribution;
/*Update inventory position and on-hand
inventory for nominal system*/
OldW_i=W_i
W_i=max(0,W_i-D_i);
B_i=B_i+max(0,D_i-OldW_i);
Y_i=W_i+TOTORD-B_i;
/*Check flags and trace path for the Perturbed
System with respect to changes in q if
necessary*/
If(PASWITCH==OFF)
{
If (JEPA=OFF)
{
PW_i=PW_i+PO_i;
PTOTORD=PTOTORD-PO_i;
POldW_i=PW_i;
PW_i=max(0,PW_i-PB_i);
PB_i=max(0, PB_i-POldW_i);
PY_i=PW_i+PTOTORD-PB_i;
}
ELSE
JEPA=OFF;
If(PY_i<s) then
{
PORDAMT=S+DELTA-PY_i;
PO_{i+L}=PO_{i+L}+PORDAMT;
PTOTORD=PTOTORD+PORDAMT
PY_i=PY_i+PORDAMT;
}
/*Update Statistics for perturbed path with
respect to changes in q*/
POldW_i=PW_i;
PW_i=max(0,PW_i-D_i)
PB_i=PB_i+max(0, PW_i-D_i);
/*Cumulate Difference Statistics for Perturbed
System with respect to changes in q*/
PTOTB=PTOTB+(PB_i-B_i);
PTOTW-PTOTW+(PW_i-W_i);
}
/*Update Cumulative Statistics for Nominal
System;*/
TOTB=TOTB+B_j
TOTW=TOTW+W_i
/*Perform Adjusted IPA calculations*/
IF (B_i>0)
{
DWDSMINUS+=DELTA;
IF PASWITCH==ON THEN DWDQMINUS+=DELTA;
}
ELSE
{
DWDSPLUS+=DELTA;
IF PASWITCH==ON THEN DWDQPLUS+=DELTA;
}
}
}
Results after N Replications:

ΔE($\overline{WT}$)/Δs=(DWDSPLUS)/(N*T);
ΔE($\overline{BT}$)/Δs=(-DWDSMINUS)/(N*T);
ΔE($\overline{WT}$)/Δq=(DWDQPLUS+PTOTW)/(N*T);
ΔE($\overline{BT}$)/Δq={-DWDQMINUS+PTOTB)/(N*T);
```

While the invention has been described in terms of a single preferred embodiment, those skilled in the art will recognize that the invention can be practiced with modification within the spirit and scope of the appended claims.

Having thus described our invention, what we claim as new and desire to secure by letters patent is as follows:

1. A computer implemented method for generating sensitivity information for an (R,s,S) policy inventory control system with back-ordered demand, where s is a specified reorder point and S is a specified order up to level value such that when an inventory position is below s at the start of a time period an order is placed to bring the inventory position up to S, said method comprising the steps of:

reading input data from databases on inventory and simulation parameters and initializing variables, said parameters including a perturbation value Δ;

for a time horizon under consideration, performing an inventory simulation with perturbation analysis, the perturbation analysis including a tracking of a plurality of paths of events representing an inventory state of a nominal system based on s and S, and an inventory state of one perturbed system based on q perturbed by the value Δ where q=(S−s), using a combination of an adjusted Infinitesimal Perturbation Analysis (IPA) algorithm and a set of finite difference calculations;

based on the perturbation analysis for the time horizon under consideration, calculating sensitivity information on average inventory and back orders with respect to changes of Δ in s and S values;

computing an average change over all replications of the step of calculating; and updating average statistics and outputting sensitivity information on performance measures.

2. The computer implemented method for generating sensitivity recited in claim 1 wherein the step of performing an inventory simulation with perturbation analysis comprises the steps of:

determining if nominal and perturbed paths have converged to a same event sequence and setting flags representing a sequence of events associated with the physical inventory of the nominal system, and a perturbed system, said perturbed system based on said q value perturbed by the Δ value;

receiving incoming orders for the period and updating the inventory level and outstanding orders for the nominal system;

satisfying back orders and then updating the inventory;

determining if an order is to be placed for the nominal system, and if so, checking conditions for starting a trace of the perturbed path with respect to changes in q, and constructing a perturbed path with respect to a change in q corresponding to said $\Delta$ value;

calculating an order amount and updating an order position for the nominal system;

generating a demand value;

updating current period statistics for the nominal system;

cumulating a plurality of difference statistics for the perturbed system with respect to changes in q corresponding to the $\Delta$ value;

checking the flags and tracing the path for the perturbed system with respect to q;

updating the statistics for the perturbed path with respect to changes in q and updating the cumulative statistics for the nominal system; and performing adjusted IPA calculations.

3. The computer implemented method for generating sensitivity recited in claim 2 further comprising the step of replicating, for a time horizon under consideration, the step of performing an inventory simulation with perturbation analysis, wherein the step of generating a demand value in each replication uses a random demand value based on a predetermined statistical model, and wherein said step of computing an average change provides average sensitivity information on performance measures reflecting average inventory and back orders per unit change in s and q where q=(S−s), and updating average statistics to reflect said replications.

4. A computer system for generating sensitivity information for an (R,s,S) inventory system with back ordered demand, where s is a specified reorder point and S is a specified order up to level value such that when an inventory position is below s at the start of a time period an order is placed to bring the inventory position up to S comprising:

a first input database containing inventory parameters;

a second input database containing simulation parameters;

a processor connected to said first and second input databases, said processor reading said inventory parameters and said simulation parameter settings and executing methods for calculating average unit change in s and q over all replications and updating average statistics where q=(S−s), said methods being executed for a time horizon under consideration, said processor having means for tracking of a plurality of paths of events representing an inventory state of a nominal system based on s and S, and an inventory state of a perturbed system based on q perturbed by the value $\Delta$, where q=(S−s), said processor using a combination of an adjusted Infinitesimal Perturbation Analysis (IPA) algorithm and a set of finite difference calculations based on a convergence of event sequences for said plurality paths, and said processor calculating an average change; and an output database connected to the processor, said processor outputting sensitivity information on performance measures to said output database.

5. The computer system recited in claim 4 wherein said processor executes said methods for calculating average unit change in s and q for a predetermined number of replications and calculates an average change over all replications.

6. A computer program product comprising:

a computer usable medium having computer readable program code embodied in the medium for generating sensitivity information for an (R,s,S) policy inventory control system with back-ordered demand, where s is a specified reorder point and S is a specified order up to level value such that when an inventory position is below s at the start of a time period an order is placed to bring the inventory position up to S, the computer program product having:

first computer program code for reading input data from databases on inventory and simulation parameters and initializing variables, the parameters including a perturbation value $\Delta$;

second computer program code for, a time horizon under consideration, performing an inventory simulation with perturbation analysis, the perturbation analysis including a tracking of a plurality of paths of events representing an inventory state of a nominal system based on s and S, and an inventory state of one perturbed system based on q perturbed by the value $\Delta$, where q=(S−s), using a combination of an adjusted Infinitesimal Perturbation Analysis (IPA) algorithm and a set of finite difference calculations;

third computer program code for, based on the perturbation analysis for the time horizon under consideration, calculating sensitivity information on average inventory and back orders with respect to changes of $\Delta$ in s and S values;

fourth computer program code for computing an average change over all replications of the step of calculating; and fifth computer program code for updating average statistics and outputting sensitivity information on performance measures.

7. A computer program product of claim 6 wherein the second computer program code includes:

sixth computer program code for determining if nominal and perturbed paths have converged to a same event sequence and setting flags representing a sequence of events associated with the physical inventory of the nominal system, and a perturbed system, the perturbed system being based on said q value perturbed by the $\Delta$ value;

seventh computer program code for receiving incoming orders for the period and updating the inventory level and outstanding orders for the nominal system;

eighth computer program code for satisfying back orders and then updating the inventory;

ninth computer program code for determining if an order is to be placed for the nominal system, and if so, checking conditions for starting a trace of the perturbed path with respect to changes in q, and constructing a perturbed path with respect to a change in q corresponding to said $\Delta$ value;

tenth computer program code for calculating an order amount and updating an order position for the nominal system;

eleventh computer program code for generating a demand value;

twelfth computer program code for updating current period statistics for the nominal system;

thirteenth computer program code for cumulating a plurality of difference statistics for the perturbed system with respect to changes in q corresponding to the $\Delta$ value;

fourteenth computer program code for checking the flags and tracing the path for the perturbed system with respect to q;

fifteenth computer program code for updating the statistics for the perturbed path with respect to changes in q and updating the cumulative statistics for the nominal system; and sixteenth computer program code for performing adjusted IPA calculations.

8. A computer program product of claim 7 having:

seventeenth computer program code for replicating, for a time horizon under consideration, the step of performing an inventory simulation with perturbation analysis, wherein the step of generating a demand value in each replication uses a random demand value based on a predetermined statistical model, and wherein said step of computing an average change provides average sensitivity information on performance measures reflecting average inventory and back orders per unit change in s and q where q=(S−s), and updating average statistics to reflect said replications.

* * * * *